Oct. 13, 1931.    R. R. HAZLETT ET AL    1,826,933
ELECTRIC SOLDERING IRON
Filed March 12, 1930    2 Sheets-Sheet 1
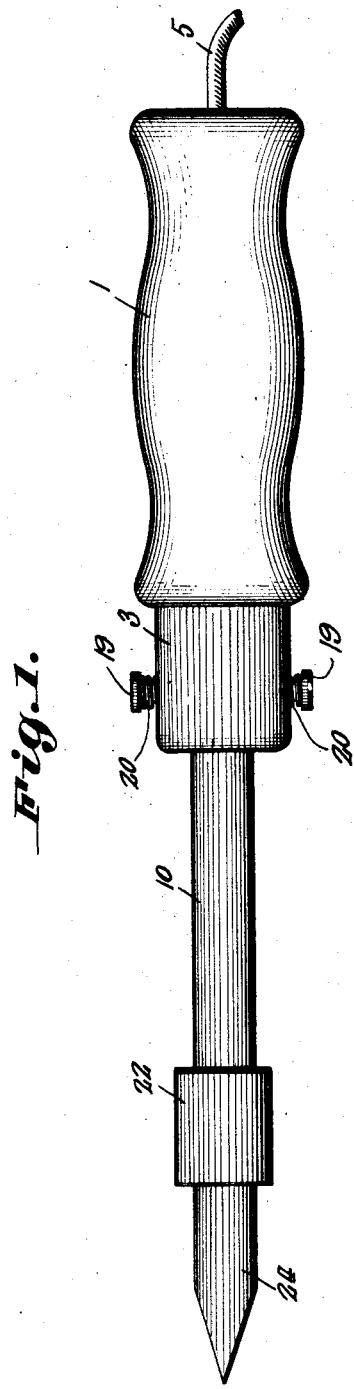
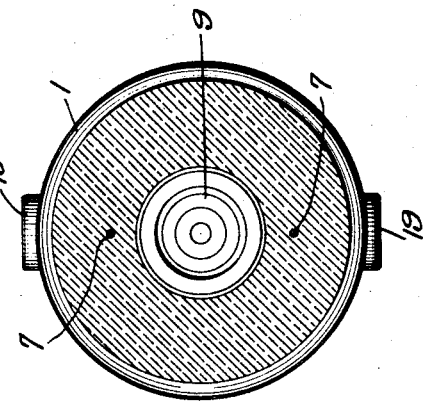
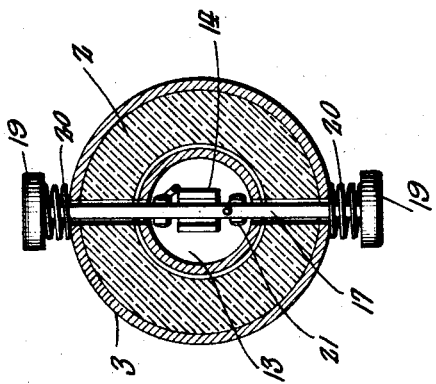
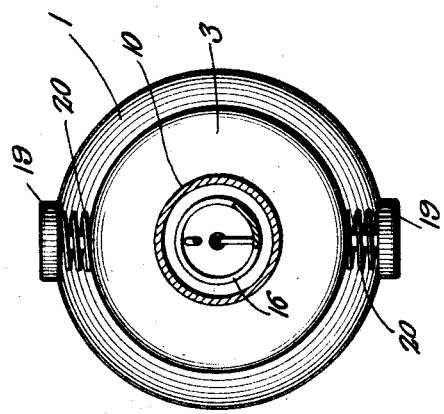
W. J. Alexander, and
R. R. Hazlett,
INVENTOR
BY Victor J. Evans
ATTORNEY Oct. 13, 1931.  R. R. HAZLETT ET AL  1,826,933
ELECTRIC SOLDERING IRON
Filed March 12, 1930  2 Sheets-Sheet 2
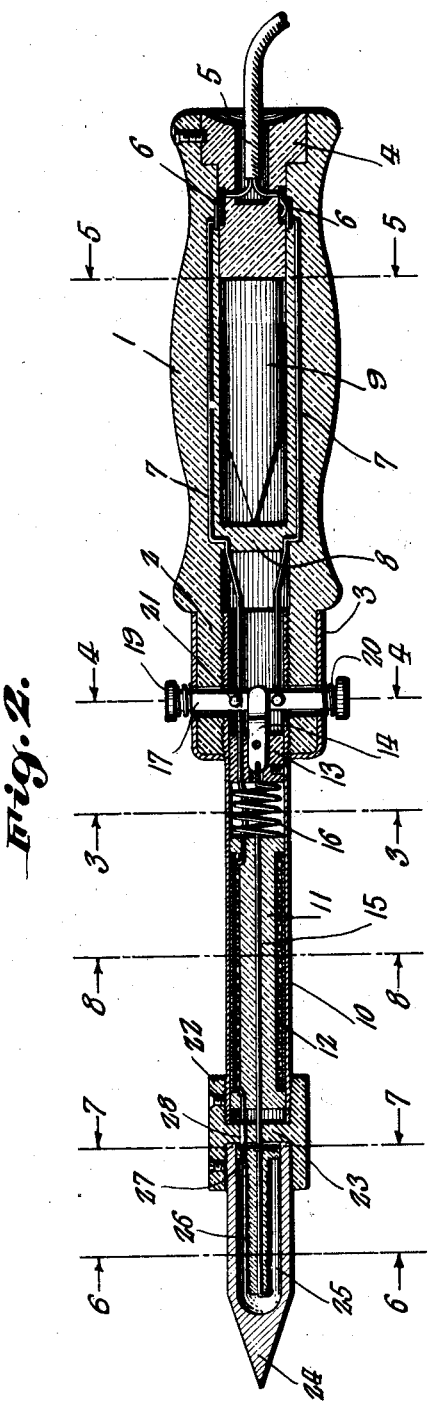
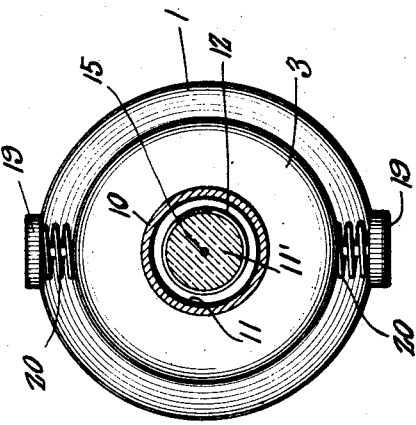
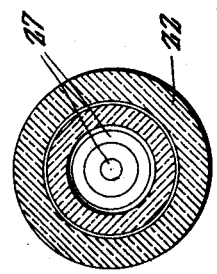
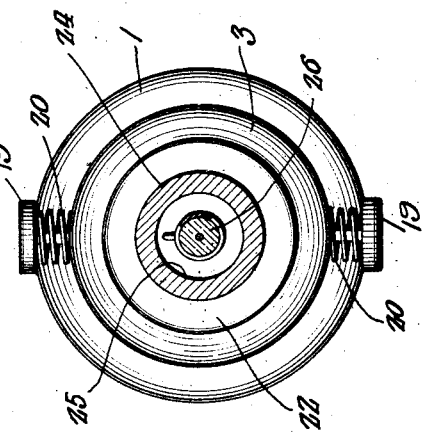
W. J. Alexander and
R. R. Hazlett,
INVENTOR
BY Victor J. Evans
ATTORNEY Patented Oct. 13, 1931

1,826,933

UNITED STATES PATENT OFFICE

RAYMOND R. HAZLETT AND WILLIAM J. ALEXANDER, OF LINDEN, NEW JERSEY

ELECTRIC SOLDERING IRON

Application filed March 12, 1930. Serial No. 435,251.

The object of this invention is to produce a soldering iron which will be heated almost instantly by an electric current and which will consume the current only when actually in use and one which will concentrate and retain heat for a comparatively great length of time so that the iron may be used after the current has been shut off.

To the attainment of the foregoing the invention consists in the improvement hereinafter described and definitely claimed.

In the drawings:

Figure 1 is a side elevation of an electric soldering iron in accordance with this invention.

Figure 2 is a central longitudinal sectional view therethrough.

Figure 3 is an enlarged transverse sectional view on the line 3—3 of Figure 2.

Figure 4 is a similar sectional view approximately on the line 4—4 of Figure 2.

Figure 5 is a similar view approximately on the line 5—5 of Figure 2.

Figure 6 is a similar sectional view approximately on the line 6—6 of Figure 2.

Figure 7 is a similar sectional view approximately on the line 7—7 of Figure 2.

Figure 8 is a similar sectional view approximately on the line 8—8 of Figure 2.

The hollow handle 1 of the improvement is preferably of some strong insulated material although the same may be of wood and may have a fibre shell of insulating material arranged in the bore thereof. The reduced end 2 of the handle 1 has its bore interiorly threaded and the said end is surrounded by a metal ferrule 3. The outer end of the handle 1 is closed by a removable plug 4 of insulating material. The plug from its outer end is provided with a socket for the conductor wires 5, the said wires being suitably encased and, of course, provided with a socket which is plugged to a houshold current. The wires are oppositely directed and have their ends connected to spring contacts 6 which are received in suitable depressions in the plug. These contacts engage similar contacts on the ends of conductor wires 7 which pass through suitable openings in the handle 1, and likewise pass through a shoulder 8 that divides the bore of the plug from the bore of the reduced extension 2. The bore of the plug is designed to have removably seated therein an extra soldering point 9.

There is screwed in the bore of the end 2 of the handle 1 one end of a tubular stem 10. The stem is of metal but has arranged therein a mica or like insulator shell 11. In the hollow stem 10 there is received the porcelain or like insulated body 11′ for a resistance coil 12. One of the conductor wires 7 is wound around the insulator core 11′.

This wire is directed through a fibre block 13 that is fixed in the stem 10. The fibre block has fixedly secured therein the end of a bifurcated spring metal contact member 14. The contact member has connected thereto a conductor wire 15 that is directed centrally through the core 11′, and which is preferably coiled upon itself, as at 16, at the portion thereof arranged between the block 13 and the core 11′.

The numeral 17 designates a switch rod which passes transversely through the end 2 of the handle and through the ferrule 3. Both ends of the rod are formed with heads 19 and surrounding the rod and exerting a pressure between these heads and the ferrule 3 there are coiled springs 20. The rod 17 has fixed thereon spaced contacts 21, either of which is engageable with the bifurcated contact 14 through which the rod 17 is guided, but with which the rod does not contact.

We preferably but not necessarily screw on the outer end of the stem 10 a coupling 22 of insulating material. The coupling is provided with a central partition 23 which traverses its bore and in the outer end of the coupling 22 we screw a soldering point 24. The soldering point, from its threaded end is hollow or otherwise formed with a longitudinally extending pocket 25 and in this pocket there is received the heating element 26, the core of which is of insulating material and both the central wire or filament of the heating element and the wire or filament which is coiled around the heating elements terminate in inner contacts 27, respectively, which are engaged by similar contacts 28, respectively, on the ends of the conductor wires 7 and 15, respectively. The second conductor wire 7 is fixed on the rod 17 of the switch.

With our improvement the tip 24 may be cheaply constructed and applied or removed in a minimum amount of time. The extra tip which is housed in the handle 1 can be easily removed therefrom by simply withdrawing the plug 4 from the handle. The tip will be heated instantly when the switch is operated and because of the resistance coil the heating unit will retain heat for a considerable length of time after the current has been cut off and consequently the tip will be likewise heated for a determined length of time under such conditions so that the tip may be employed for soldering purposes even when the current is disconnected from the improvement which, of course, results in a material saving. The construction and advantages of the improvement will, it is thought, be readily apparent to those skilled in the art to which such invention relates so that further detailed description will not be required but obviously changes may be made from the construction as set forth and illustrated. As stated the coupling 22 may be dispensed with and the tip may be screwed or otherwise secured to the outer end of the stem 10.

Having described the invention, we claim:

1. A soldering iron including a handle and a hollow stem extending therefrom and a hollow soldering point connected to the outer end of the stem, conductor wires directed through the handle, a resistance element in the stem, insulated therefrom and to which one of the conductor wires is connected, a second conductor wire passing centrally through the core of the resistance element, a heating element having contacts engaging with the ends of both of the said wires, a bifurcated contact with which said wire is connected, a spring influenced rod movable through one end of the handle and through the bifurcated end of the contact and to which the second wire through the handle is connected, contacts on the rod to engage with the bifurcated contact, a hollow soldering point on the outer end of the stem, and contacts for the ends thereof to engage with the wires of the resistance element.

2. A soldering iron including a hollow handle of insulating material having a reduced end, a plug of insulating material for closing the second end of the handle, and for likewise enclosing a soldering point in the handle, conductor wires directed through the plug and connected with spring contacts pocketed in the plug, conductor wires directed through the handle having contacts to engage with the first mentioned contacts, a hollow stem on the reduced end of the handle, a resistance element in the stem to which one of the conductor wires from the handle is connected, a second conductor wire passing centrally through the core of the resistance element and having a coiled portion, an insulator block in the stem, a bifurcated contact having one end secured in the block and to which the end of the coil is connected, a rod movable laterally through the reduced end of the handle having headed ends and springs surrounding the rods and exerting a pressure against the heads, the second conductor wire directed through the handle being connected to the rod, spaced contacts on the rod to engage with the bifurcated contact when the rod is moved longitudinally in either direction, an insulator coupling on the outer end of the stem having a central partition therein for the wires of the resistance element, a hollow soldering point removably secured in the outer end of the coupling, and a heating element in the point having contacts on the ends thereof to engage with the ends of the wires of the resistance element.

In testimony whereof we affix our signatures.

RAYMOND R. HAZLETT.
WILLIAM J. ALEXANDER.